US009881235B1

(12) United States Patent
Narimanzadeh

(10) Patent No.: US 9,881,235 B1
(45) Date of Patent: Jan. 30, 2018

(54) SYSTEM, APPARATUS, AND METHOD FOR DETERMINING PHYSICAL DIMENSIONS IN DIGITAL IMAGES

(71) Applicant: Mahmoud Narimanzadeh, Laguna Niguel, CA (US)

(72) Inventor: Mahmoud Narimanzadeh, Laguna Niguel, CA (US)

( * ) Notice: Subject to any disclaimer, the term of this patent is extended or adjusted under 35 U.S.C. 154(b) by 68 days.

(21) Appl. No.: 14/948,076

(22) Filed: Nov. 20, 2015

Related U.S. Application Data

(60) Provisional application No. 62/083,099, filed on Nov. 21, 2014.

(51) Int. Cl.
G06K 9/00 (2006.01)
G06K 9/36 (2006.01)
G01B 11/30 (2006.01)
G06K 9/62 (2006.01)
G06K 9/38 (2006.01)

(52) U.S. Cl.
CPC ............ G06K 9/624 (2013.01); G06K 9/38 (2013.01); G06K 9/6249 (2013.01)

(58) Field of Classification Search
USPC ......... 382/194, 106, 154, 103, 286; 356/603
See application file for complete search history.

(56) References Cited

U.S. PATENT DOCUMENTS

| 4,768,879 | A | | 9/1988 | McLachlan et al. |
| 5,768,443 | A | * | 6/1998 | Michael ............... G06T 5/006 |
| | | | | 382/151 |
| 5,838,428 | A | | 11/1998 | Pipitone et al. |
| 5,944,598 | A | * | 8/1999 | Tong ..................... A22B 5/007 |
| | | | | 382/100 |
| 6,100,984 | A | | 8/2000 | Chen et al. |
| 6,335,758 | B1 | * | 1/2002 | Ochi ...................... H04N 3/08 |
| | | | | 348/240.3 |

(Continued)

OTHER PUBLICATIONS

Fernandes et al., Computing Box Dimensions from Single Perspective Images in Real Time, UFRGS—Instituto de Informatica.

(Continued)

Primary Examiner — Kathleen Y Dulaney
(74) Attorney, Agent, or Firm — Knobbe Martens Olson & Bear LLP

(57) ABSTRACT

A system and method is provided for generating a digital image configured to facilitate measuring at least one physical dimension in the digital image. At least one light source is configured to project a plurality of substantially parallel light beams onto at least one physical object spaced away from the at least one light source. The light beams form a reference pattern on the at least one physical object. The reference pattern includes at least one feature defining a physical dimension having a predetermined magnitude. A digital camera is configured to store a digital image of at least a portion of the at least one physical object and the at least one feature. The digital image includes an image data file having a plurality of pixels and metadata. At least a portion of the metadata is indicative of a conversion factor relating the predetermined magnitude of the physical dimension with a pixel distance corresponding to the predetermined magnitude of the physical dimension.

22 Claims, 11 Drawing Sheets

(56) References Cited

U.S. PATENT DOCUMENTS

| | | | |
|---|---|---|---|
| 6,704,099 B2* | 3/2004 | Uomori | G01B 11/25 345/173 |
| 6,975,755 B1* | 12/2005 | Baumberg | G06K 9/4642 345/419 |
| 6,995,762 B1* | 2/2006 | Pavlidis | G06T 17/00 345/419 |
| 7,013,040 B2* | 3/2006 | Shiratani | G01B 11/2509 345/420 |
| 7,092,563 B2* | 8/2006 | Shiratani | G01B 11/25 345/419 |
| 7,176,440 B2* | 2/2007 | Cofer | G01B 11/25 250/221 |
| 7,365,301 B2 | 4/2008 | Sasaki | |
| 7,502,125 B2* | 3/2009 | Suzuki | G01B 11/2527 356/603 |
| 7,576,845 B2* | 8/2009 | Asakura | G01B 11/24 356/73 |
| 8,103,058 B2 | 1/2012 | Niskanen et al. | |
| 8,150,142 B2 | 4/2012 | Freedman et al. | |
| 8,340,420 B2 | 12/2012 | Smith et al. | |
| 8,390,821 B2 | 3/2013 | Shpunt et al. | |
| 8,456,517 B2 | 6/2013 | Spektor et al. | |
| 8,493,496 B2 | 7/2013 | Freedman et al. | |
| 8,494,252 B2 | 7/2013 | Freedman et al. | |
| 8,514,225 B2* | 8/2013 | Genova | G06T 15/205 345/422 |
| 8,619,049 B2 | 12/2013 | Harrison et al. | |
| 8,708,497 B2 | 4/2014 | Tsuyuki | |
| 8,749,796 B2 | 6/2014 | Pesach et al. | |
| 8,885,916 B1* | 11/2014 | Maurer | G06K 9/6202 348/137 |
| 8,950,872 B2 | 2/2015 | Hasegawa | H04N 9/3194 348/189 |
| 2002/0164066 A1* | 11/2002 | Matsumoto | G01N 21/95607 382/149 |
| 2003/0123707 A1* | 7/2003 | Park | G01B 11/2513 382/106 |
| 2004/0008259 A1 | 1/2004 | Gokturk et al. | |
| 2006/0245623 A1* | 11/2006 | Loiacono | G06K 9/2027 382/117 |
| 2007/0003166 A1* | 1/2007 | Berkner | G06K 9/00463 382/298 |
| 2007/0053577 A1* | 3/2007 | Schanz | G01N 21/95607 382/145 |
| 2007/0057946 A1 | 3/2007 | Albeck et al. | |
| 2007/0177166 A1 | 8/2007 | Habets et al. | |
| 2007/0263903 A1* | 11/2007 | St. Hilaire | G01B 11/25 382/106 |
| 2008/0069399 A1* | 3/2008 | Nagao | G06T 7/215 382/103 |
| 2008/0137963 A1* | 6/2008 | Chevallier | H04N 5/913 382/206 |
| 2009/0148038 A1* | 6/2009 | Sawachi | H04N 13/0022 382/154 |
| 2010/0002905 A1* | 1/2010 | Van Berkel | H01J 49/0459 382/100 |
| 2010/0111367 A1* | 5/2010 | Hiraoka | G01B 11/2522 382/106 |
| 2010/0149315 A1* | 6/2010 | Qu | A61B 1/00193 348/46 |
| 2010/0260409 A1* | 10/2010 | Ben-Levy | G01B 11/2518 382/141 |
| 2012/0177252 A1* | 7/2012 | Korekado | G01S 7/4915 382/106 |
| 2012/0224052 A1 | 9/2012 | Bae | |
| 2013/0107010 A1* | 5/2013 | Hoiem | G06T 7/0081 348/47 |
| 2013/0194404 A1 | 8/2013 | Christiansen et al. | |
| 2013/0230224 A1* | 9/2013 | Claude | A61B 5/055 382/131 |
| 2013/0256411 A1 | 10/2013 | Schuler et al. | |
| 2014/0031665 A1 | 1/2014 | Pinto et al. | |
| 2014/0064602 A1* | 3/2014 | Li | G06K 9/4604 382/154 |
| 2014/0270540 A1 | 9/2014 | Spector et al. | |
| 2015/0223730 A1* | 8/2015 | Ferrantelli | A61B 5/1072 600/476 |
| 2016/0253813 A1* | 9/2016 | Hou | G01N 21/956 382/106 |

OTHER PUBLICATIONS

Rothman et al., Measuring Physical Traits of Primates Remotely; The Use of Parallel Lasers, American Journal of Primatology 70: 1-5 (2008), pp. 1-5.

* cited by examiner

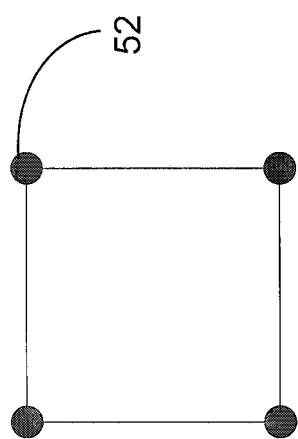
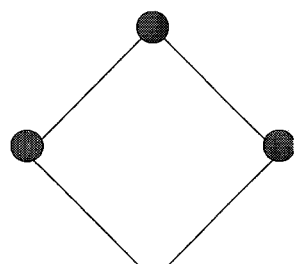
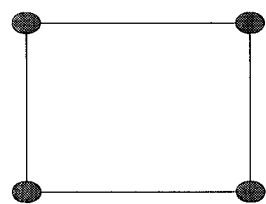
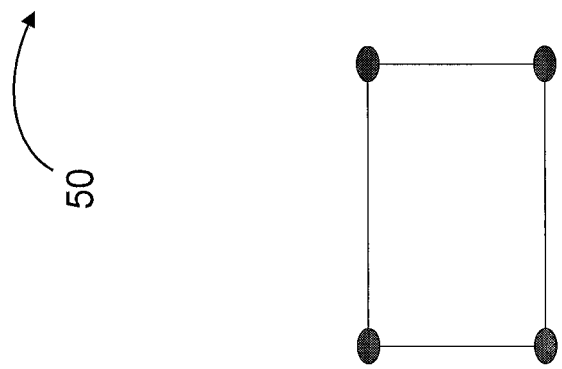
Figure 4A
Figure 4B
Figure 4C
Figure 4D

SYSTEM, APPARATUS, AND METHOD FOR DETERMINING PHYSICAL DIMENSIONS IN DIGITAL IMAGES

CROSS-REFERENCE TO RELATED APPLICATIONS

This application claims the benefit of priority to U.S. Provisional Appl. No. 62/083,099, filed on Nov. 21, 2014 and incorporated in its entirety by reference herein.

BACKGROUND

Field

This application is generally directed to systems, apparatus, and methods for generation and analysis of digital images and for digital image processing.

Description of the Related Art

Conventional digital images do not contain any real-world unit size information of the objects captured in them. However, the distance between any two points in the image can be measured in pixels.

In previously disclosed methods to take real-world size measurements from a digital image, a physical object with known dimensions (for example a credit card) is found in the image and then from that known object, the size of any other object in the image is deduced. There are two problems with such methods: (a) Not all images contain objects of known size; and (b) This method is essentially a manual method that requires the end user to find a physical object of known dimensions in the image and to analyze the image and make assumptions about the rest of the objects in the image.

One previously disclosed method proposed a system in which a distance sensor is used in conjunction with a mobile device. The combination of the knowledge of the focal distance of the lens of the device and distance from an object obtained from the distance sensor would then give a reference point for measuring the size of objects in the image. The problems with this method include: (a) Prior knowledge of the lens of the camera is required; (b) There could be many objects in the scene and it will not be clear the measurements would apply to which objects in the scene; and (c) Generally distance sensors are expensive.

SUMMARY

In certain embodiments, an apparatus is configured to generate a digital image configured to facilitate measuring at least one physical dimension in the digital image. The apparatus comprises at least one light source configured to project a plurality of substantially parallel light beams onto at least one physical object spaced away from the at least one light source. The light beams form a reference pattern on the at least one physical object. The reference pattern comprises at least one feature defining a physical dimension having a predetermined magnitude. The apparatus further comprises a digital camera configured to store a digital image of at least a portion of the at least one physical object and the at least one feature. The digital image comprises an image data file comprising a plurality of pixels and metadata. At least a portion of the metadata is indicative of a conversion factor relating the predetermined magnitude of the physical dimension with a pixel distance corresponding to the predetermined magnitude of the physical dimension.

In certain embodiments, an image processing circuit is operable to determine a conversion factor of a digital image for measuring at least one physical dimension in the digital image. The image processing circuit comprises an input configured to receive at least a portion of the digital image depicting at least one physical object with a reference pattern projected onto the at least one physical object. The reference pattern comprises at least one feature having a physical dimension with a predetermined magnitude. The image processing circuit further comprises an image analysis circuit operable to: (i) identify the at least one feature in the portion of the digital image; (ii) determine a number of pixels corresponding to the at least one feature in the portion of the digital image; and (iii) generate a conversion factor equal to the predetermined magnitude divided by the number of pixels.

In certain embodiments, a system is configured to measure at least one physical dimension in a digital image. The system comprises an input configured to receive at least a portion of the digital image having a predetermined pixel distribution and depicting at least one physical object. The digital image has a conversion factor that relates pixels to physical dimensions within the digital image. The system further comprises a measuring circuit operable to: (i) select at least two pixels within the portion of the digital image, the two pixels corresponding to two locations on the at least one physical object depicted by the digital image; (ii) determine a number of pixels along a line defined by the two pixels within the portion of the digital image; and (iii) calculate a physical distance between the two locations on the at least one physical object by multiplying the conversion factor with the number of pixels.

The paragraphs above recite various features and configurations of one or more methods, systems, circuits, and computer storage that have been contemplated by the inventor(s). It is to be understood that the inventor(s) have also contemplated methods, systems, circuits, and computer storage which comprise combinations of these features and configurations from the above paragraphs, as well as methods, systems, circuits, and computer storage which comprise combinations of these features and configurations from the above paragraphs with other features and configurations disclosed in the following paragraphs.

BRIEF DESCRIPTION OF THE DRAWINGS

The foregoing aspects and many of the attendant advantages provided by certain embodiments described herein will become more readily appreciated as the same become better understood by reference to the following detailed description, when taken in conjunction with the accompanying drawings.

FIGS. 4A-4D schematically illustrate various deformities of the reference pattern projected onto a surface of a physical object in accordance with certain embodiments described herein.

DETAILED DESCRIPTION

Figure 1:
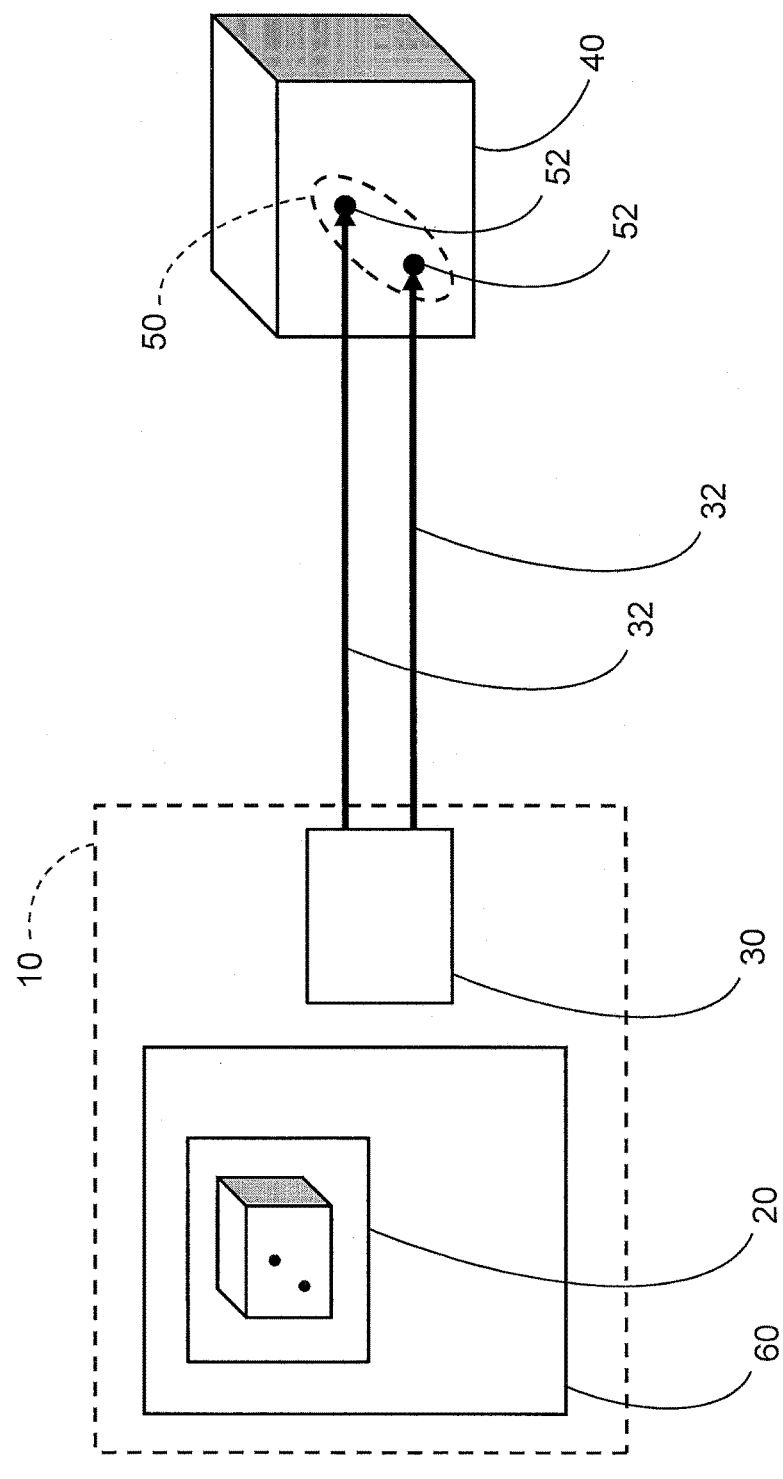
FIG. 1 schematically illustrates an example apparatus in accordance with certain embodiments described herein.

Although commonly used terms are used to describe the systems, methods, and apparatuses of certain embodiments for, ease of understanding, these terms are used herein to have their broadest reasonable interpretation, as described in more detail herein. Although various aspects of the disclosure will be described with regard to illustrative examples and embodiments, one skilled in the art will appreciate that the disclosed embodiments and examples should not be construed as limiting.

Certain embodiments described herein include methods which are performed by computer hardware, software or both, comprising one or more modules. The hardware used for certain embodiments described can take a wide variety of forms, including processors, mobile devices (e.g., smartphones, tablets), personal computers, mainframe computers and the like. The hardware running the software will typically include one or more input devices, such as a mouse, trackball, touchpad, and/or keyboard, a display, and computer-readable memory media, such as random-access memory (RAM) integrated circuits and a data storage device (e.g., tangible storage, non-transitory storage, flash memory, hard-disk drive). It will be appreciated that one or more portions, or all of the software code may be remote from the user and, for example, resident on a network resource, such as a LAN server, Internet server, network storage device, etc. The software code which configures the hardware to perform in accordance with certain embodiments described herein can be downloaded from a network server which is part of a local-area network or a wide-area network (such as the internet) or can be provided on a tangible (e.g., non-transitory) computer-readable medium, such as a CD-ROM or a flash drive. Various computer languages, architectures, and configurations can be used to practice the various embodiments described herein.

Certain embodiments described herein provide a system, apparatus, and method for generating a digital image which is configured to facilitate measuring at least one physical dimension (e.g., real-world unit size information) in the digital image, to measure at least one physical dimension in the digital image, or both.

For example, certain embodiments can provide an apparatus configured to generate a digital image configured to facilitate measuring at least one physical dimension in the digital image. The apparatus can comprise at least one light source configured to project a plurality of substantially parallel light beams onto a physical object spaced away from the light source. The light beams can form a reference pattern on the physical object. The reference pattern comprises at least one feature defining a physical dimension with a known magnitude. The apparatus can further comprise a digital camera configured to capture a digital image of at least a portion of the physical object and the at least one feature. In certain embodiments, the digital image can further comprise metadata indicative of at least one scaling factor (e.g., a ratio of the known magnitude divided by a number of pixels corresponding to the magnitude) compatible for use in calculations of physical distance between two physical points depicted within the digital image.

For another example, certain embodiments can provide a first system configured to determine a scaling ratio for a digital image that can be used to measure at least one physical dimension in the digital image. The system can comprise an input configured to receive at least a portion of the digital image depicting a physical object with a reference pattern projected onto the physical object. The reference pattern can comprise at least one feature having a physical dimension with a known magnitude. The system can further comprise an image processor circuit operable to: (i) identify the at least one feature in the portion of the digital image; (ii) determine a number of pixels corresponding to the at least one feature in the portion of the digital image; and (iii) calculate a scaling ratio equal to the known magnitude divided by the first number of pixels. In certain embodiments, the image processor circuit is further operable to generate metadata comprising the scaling ratio and to store the metadata with the digital image.

For another example, certain embodiments can provide a system configured to measure at least one physical dimension in a digital image. The system can comprise an input configured to receive at least a portion of the digital image having a known pixel distribution and depicting a physical object. The digital image can further have a scaling ratio that relates pixels to physical dimensions within the digital image. The system can further comprise a measuring circuit operable to: (i) select at least two pixels within the portion of the digital image, the two pixels corresponding to two locations on the physical object depicted by the digital image; (ii) determine a number of pixels along a line defined by the two pixels within the portion of the digital image; and (iii) calculate a physical distance between the two locations on the physical object by multiplying the scaling ratio with the number of pixels. In certain embodiments, the measuring circuit is further operable to store the calculated physical distance with the digital image. In certain embodiments, the system further comprises an image processing circuit operable to generate a composite digital image comprising the digital image combined with at least a second digital image depicting a second physical object. In the composite digital image, the digital image, the second digital image, or both the digital image and the second digital image are scaled such that the physical object and the second physical object are depicted to accurately show a relationship between the physical dimensions of the digital image and the physical dimensions of the second digital image.

In certain embodiments, a system further comprises two or more of an apparatus, an image processor circuit, and a measuring circuit, as described in the preceding paragraphs.

In certain embodiments, once the scaling factors are calculated they are embedded into the metadata of the image such that the image can now be shared with others or saved for further analysis.

In certain embodiments, the image metadata will contain information that will allow measurements in more areas than the original measurements. These images are not confined to one measurement only but can provide measurements in certain regions of the image that are determined either through edge detection techniques in conjunction with finding of reference features or determined by user. Edge detection techniques (e.g., in hardware, in software, or in both) can flag regions of interest for measurement and user can verify such regions.

Certain embodiments described herein advantageously provide an improved way of correlating the distance in pixels to an actual unit of measurement such as millimeters, so any two points in the image can be measured in real-world units of measurement (for example millimeters or inches). Certain embodiments described herein advantageously improve over previously-disclosed systems by advantageously creating a reference pattern (e.g., grid) using one or more emitting light sources (such as laser diodes) placed in a predefined formation with a known distance between light sources.

FIG. 1 schematically illustrates an example apparatus 10 in accordance with certain embodiments described herein. The apparatus 10 is configured to generate a digital image 20 configured to facilitate measuring at least one physical dimension in the digital image 20. The apparatus 10 comprises at least one light source 30 configured to project a plurality of substantially parallel light beams 32 onto at least one physical object 40 spaced away from the at least one light source 30. The light beams 32 form a reference pattern 50 on the at least one physical object 40. The reference pattern 50 comprises at least one feature 52 defining a physical dimension having a predetermined magnitude. The apparatus 10 further comprises a digital camera 60 configured to store the digital image 20 of at least a portion of the at least one physical object 40 and the at least one feature 52. The digital image 20 comprises an image data file 22 comprising a plurality of pixels 24 and metadata 26. At least a portion of the metadata 26 is indicative of a conversion factor relating the predetermined magnitude of the physical dimension with a pixel distance corresponding to the predetermined magnitude of the physical dimension (e.g., within the digital image 20).

In certain embodiments, the at least one physical object 40 comprises one or more inanimate objects (e.g., buildings, automobiles, furniture, clothing), one or more animate objects (e.g., humans, animals), or both. The at least one physical object 40 can be stationary or can be in motion while the digital image 20 is acquired by the digital camera 60.

In certain embodiments, the at least one light source 30 comprises one or more light emitting devices (e.g., laser diodes) that emit the substantially parallel light beams 32 and project the light beams 32 onto the at least one physical object 40 spaced away from the at least one light source 30. The light beams 32 emitted by the light emitting devices of the at least one light source 30 can have high uniformity and can scatter very little along their optical path, thereby providing a recognizable reference mark on the object 40 to be measured. For example, the at least one light source 30 can comprise two, three, four, five, six, or more light emitting devices, each of which emits a corresponding light beam 32. For another example, the at least one light source 30 can comprise a single light emitting device (e.g., laser diode) and one or more reflective elements (e.g., mirrors) configured to reflect light from the single light emitting device into a plurality of light beams 32 that are substantially parallel to one another and are projected onto the at least one physical object 40. In certain embodiments, the light emitting devices of the at least one light source 30 are positioned at predetermined distances relative to one another such that the substantially parallel light beams 32 impinge the physical object at positions having the predetermined distances relative to one another. In one example, the distance between the light emitting devices can be one inch, and the reference pattern 50 can comprise a square which can be used to provide height and width ratios. Other distances between the light emitting devices would work as well. For example, for measuring physical objects 40 that are farther away from the digital camera 60, two inches or three inches may be used. Other reference patterns 50, such as triangular, can be used as well.

In certain embodiments, the plurality of light beams 32 emitted by the at least one light source 30 are emitted by a laser diode and are collimated (e.g., using one or more collimating lenses). For example, the at least one light source 30 can comprise a lens assembly having four laser diodes built into it. In certain embodiments, the light beams 32 can be red, blue, or another color that can be distinguished by the digital camera 60 to facilitate analyzing the digital image 20 to find the reference pattern 50 within the digital image 60. In certain embodiments, the diameter of the light beam is recognizable by the digital camera 60 to facilitate analyzing the digital image 20 to find the reference pattern 50 within the digital image 60. For example, the light beam can be sufficiently concentrated to provide accuracy. The light beams 32 emitted by the at least one light source 30 are sufficiently parallel to one another such that distortion is not introduced in the resulting digital image 20 resulting in reduced accuracy of measurement.

Figure 2:
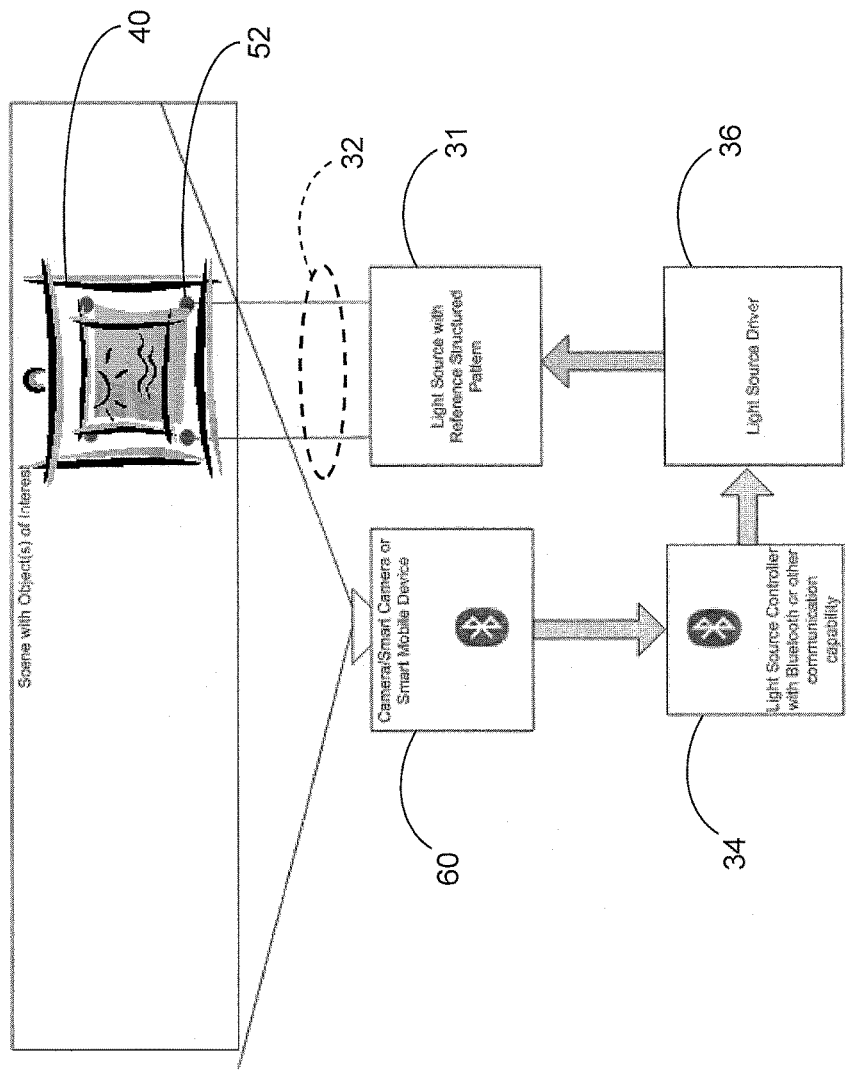
FIG. 2 schematically illustrates another example apparatus in accordance with certain embodiments described herein.

FIG. 2 schematically illustrates another example apparatus 10 in accordance with certain embodiments described herein. The at least one light source 30 comprises four laser diodes 31 mounted on a structure that creates parallel light beams 32. The at least one light source 30 can further comprise control circuitry 34, drive circuitry 36, and a power source (e.g., a battery) (not shown) that powers the light emitting devices (e.g., a battery of the digital camera 60 or a battery dedicated to powering the light emitting devices). In certain embodiments, the control circuitry 34 receives commands from the digital camera 60 (e.g., a smartphone) via a communication channel (e.g., Bluetooth) and provides control signals to the drive circuitry 36 (e.g., to selectively activate and deactivate the at least one light source 30). The drive circuitry 36 provides the power driving the laser diodes 31. The control circuitry 34 of certain embodiments can comprise a communication circuit (e.g., having Bluetooth or similar capability) to receive commands from the digital camera 60 and with input/output capability to be able to control an I/O point on demand. The control circuitry 34 of certain embodiments can further comprise a relay that turns the drive circuitry 36 on and off. The drive circuitry 36 of certain embodiments is configured to power the light sources (e.g., laser diodes).

In certain embodiments, the digital camera 60 is operable to capture one or more digital images 20 (e.g., in an imaging plane of the digital camera 60). For example, the digital camera 60 can acquire a digital image 20 using an optical sensor (e.g., a CCD sensor, a CMOS sensor) at the imaging plane and can store the acquired digital image 20 in a computer-readable storage medium (e.g., a flash memory) that is either a component of the digital camera 60 or that is remote from the digital camera 60 but in communication with the digital camera 60 (e.g., memory in the cloud). The digital camera 60 can comprise a smartphone, tablet, or other mobile user device, and can have wireless communication capability (e.g., Bluetooth).

The digital camera 60 of certain embodiments can control the at least one light source 30 by sending commands (e.g., via Bluetooth, USB, WiFi, or other communication channels) to the control circuitry 34 which then selectively activates or deactivates the at least one light source 30. In certain embodiments, the apparatus 10 can have multiple modes of operation. In one example mode of operation, the light source 30 can be turned on, the features 32 of the reference pattern 50 projected onto the physical object 40 can be identified in a digital image 20 (e.g., by the digital camera 60), and the distance between the features 32 (or the size of a feature) can be measured in terms of a number of pixels within the digital image 20. The apparatus 10 can comprise a memory (e.g., a memory of the digital camera 60) in which one or more camera-specific values ($V_C$) are stored, with each value of $V_C$ being indicative of a predetermined number of pixels that is expected for the size of the feature within a digital image 20 when the reference pattern 50 is a predetermined distance from the imaging plane of the digital camera 60. For example, a first camera-specific value $V_{C1}$ can be equal to $X_1$ pixels, corresponding to the number of pixels of an example one-inch long feature in a digital image 20 in which the reference pattern 50 is 36 inches from the imaging plane of the digital camera 60, and a second camera-specific value $V_{C2}$ can be equal to $X_2$ pixels, corresponding to the number of pixels of the example one-inch long feature in a digital image 20 in which the reference pattern 50 is 18 inches from the imaging plane of the digital camera 60. The apparent size of a feature depends on the distance of the feature from the imaging plane of the digital camera 60, so the apparatus 10 can use the one or more camera-specific values $V_C$ to relate the measured size of the feature in the digital image 20 to a distance between the digital camera 60 and the physical object 40. For example, if the example one-inch long feature of the reference pattern 50 has a size of Y pixels within the digital image 20 with $X_1<Y<X_2$, then the digital camera 60 can calculate the distance (D) of the reference pattern 50 from the imaging plane of the digital camera 60 by extrapolation using the one or more camera-specific values $V_C$, using an example extrapolation equation of $D=((X_1-X_2)/18)*Y+(2*X_2-X_1)$. Other extrapolation equations (e.g., using a single camera-specific value) can also be used. In certain embodiments, this mode of operation can keep the light source 30 on and can display the distance between the physical object 40 and the digital camera 60.

In another example mode of operation, the light source 30 can be turned on and a digital image 20 can be captured while the light source 30 is on, the digital image 20 including a depiction of the reference pattern 50 in the digital image 20. If the reference pattern 50 is projected onto a surface that is parallel to the imaging plane of the digital camera 60, then the reference pattern 50 will be undistorted. For example, a square reference pattern 50 will appear as a square pattern if the surface is parallel to the imaging plane of the digital camera 60. Even if the surface is not exactly parallel to the imaging plane (e.g., within 10 degrees of parallel, within 15 degrees of parallel, within 15 degrees of parallel), the reference pattern 50 can appear to be undistorted. However if the surface is sufficiently out-of-parallel with the imaging plane of the digital camera 60, the reference pattern 50 will appear distorted. For example, a square reference pattern 50 will appear to be a rectangle.

In still another example mode of operation, the apparatus 10 can take two consecutive images: a first image taken with the light source 30 turned on, and a second image taken with the light source 30 turned off. The digital camera 60 can detect the reference pattern 50 within the first image, can calculate the conversion factor or the measurement of the physical object 40 from the first image, and can insert the result of the calculation in the metadata of the second image. In this way, a digital image 20 can be generated that has the metadata indicative of the conversion factor but that does not depict the reference pattern.

In certain embodiments, the digital camera 60 is operable to consecutively acquire two digital images and store the two consecutive digital images: one digital image 20 taken with the at least one light source 30 activated such that the reference pattern 50 is depicted within the digital image 20, and another digital image taken with the at least one light source 30 deactivated such that the reference pattern 50 is not depicted within the digital image. The time interval between taking each of these images can be short (e.g., less than one second) such that the only difference between the two images is that one depicts the reference pattern 50 and the other does not depict the reference pattern 50. The digital image not depicting the reference pattern 50 may be of interest in certain embodiments, and the digital camera 60 can be operable to include the conversion factor derived from the digital image 20 depicting the reference pattern 50 in the metadata of the digital image not depicting the reference pattern 50.

Besides being operable to capture one or more digital images 20, the digital camera 60 can be operable to analyze the captured digital image 20 to find the reference pattern 50 and the at least one features 52 projected onto the physical object 40 depicted by the digital image 20. The digital camera 60 of certain embodiments can comprise an image processing circuit operable to determine a conversion factor of a digital image 20 for measuring at least one physical dimension in the digital image 20. While the image processing circuit of certain embodiments is a component of the digital camera 60, in certain other embodiments, the image processing circuit is a component of a device separate from the digital camera 60. The image processing circuit can comprise an input configured to receive at least a portion of the digital image 20 depicting the physical object 40 with a reference pattern 50 projected onto the physical object 40 (e.g., a digital image 20 captured by the digital camera 60) and an image analysis circuit operable to derive the conversion factor from the digital image 20. The image analysis circuit of certain embodiments can analyze the digital image 20 to identify the at least one feature 52 projected onto the physical object 40 in the portion of the digital image 20, can determine a number of pixels corresponding to the at least one feature 52 (e.g., a pixel distance), and can generate a conversion factor (e.g., a pixel density coefficient) based on the at least one feature 52 in the digital image 20 (e.g., equal to the predetermined magnitude divided by the number of pixels). In certain embodiments, the image processing circuit is operable to generate metadata comprising the conversion factor and to store the metadata with the digital image 20 (e.g., writing the conversion factor into a header of the metadata of the digital image 20).

In certain embodiments, the apparatus 10 (e.g., the digital camera 60) can utilize the size information (e.g., conversion factor) derived from the digital image 20 to display a virtual mesh (e.g., grid) overlaid (e.g., superimposed) onto the digital image 20 when displayed to the user. The virtual mesh can comprise a set of points, intersecting lines, or other indicia that repeat with a predetermined unit of distance measurement between them (e.g., every centimeter, every five centimeters, every inch, every six inches, every foot, every 2 feet) and that are overlaid (e.g., superimposed) onto the digital image 20 in positions that conform with the size information derived from the digital image 20. Such a virtual mesh can be useful for a user to gauge the distances between other objects depicted within the digital image 20.

In certain embodiments, the virtual mesh can be applied across the whole digital image 20, while in certain other embodiments, the virtual mesh can be applied across only a portion of the digital image 20. For example, the portion can be selected by the user or the portion can be selected by the apparatus 10 (e.g., the digital camera 60) which utilizes known image-processing edge detection techniques to determine the edges of a region or a physical object, and the virtual mesh can be displayed between the edges.

Figure 3A:
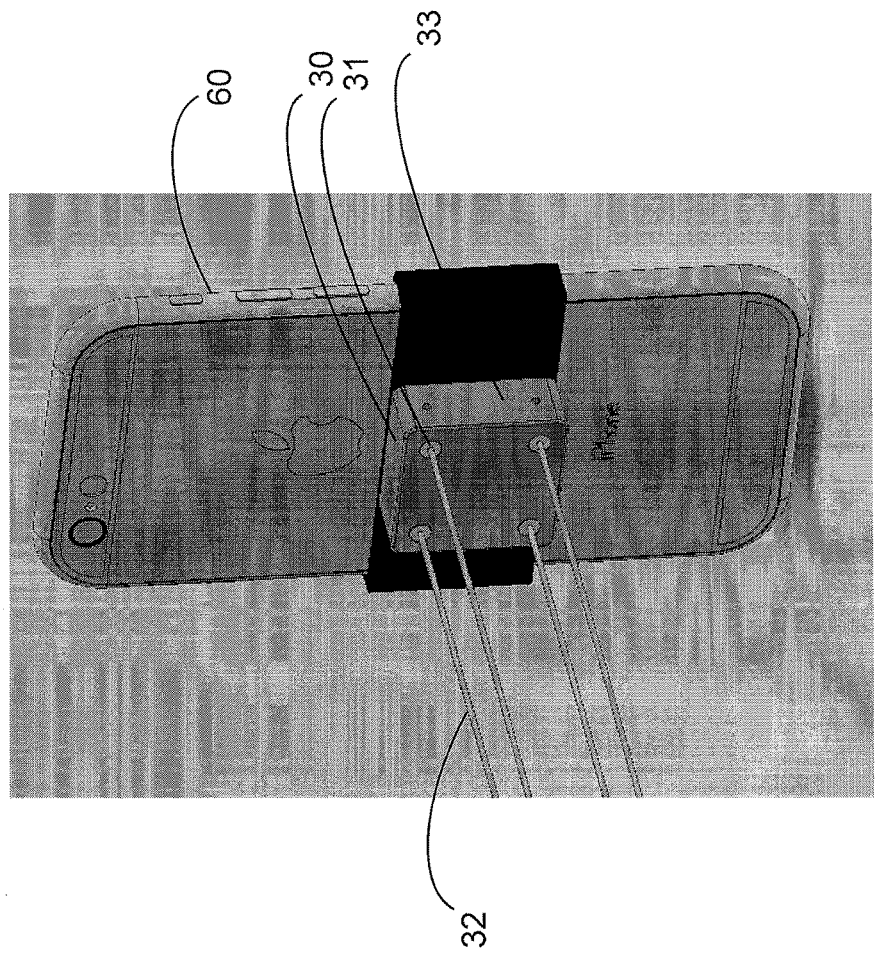
FIG. 3A schematically illustrates an example digital camera and at least one light source in accordance with certain embodiments described herein.

FIG. 3A schematically illustrates an example digital camera 60 and at least one light source 30 in accordance with certain embodiments described herein. The digital camera 60 is mechanically coupled to the at least one light source 30. For example, the apparatus 10 can comprise a clip or other mechanism to affix the at least one light source 30 to the digital camera 60 so that the at least one light source 30 can be easily selectively mounted and dismounted to the digital camera 60. In certain embodiments, the clip or other mechanism can be built into the digital camera 60 or into a case for the digital camera 60.

Figure 3B:
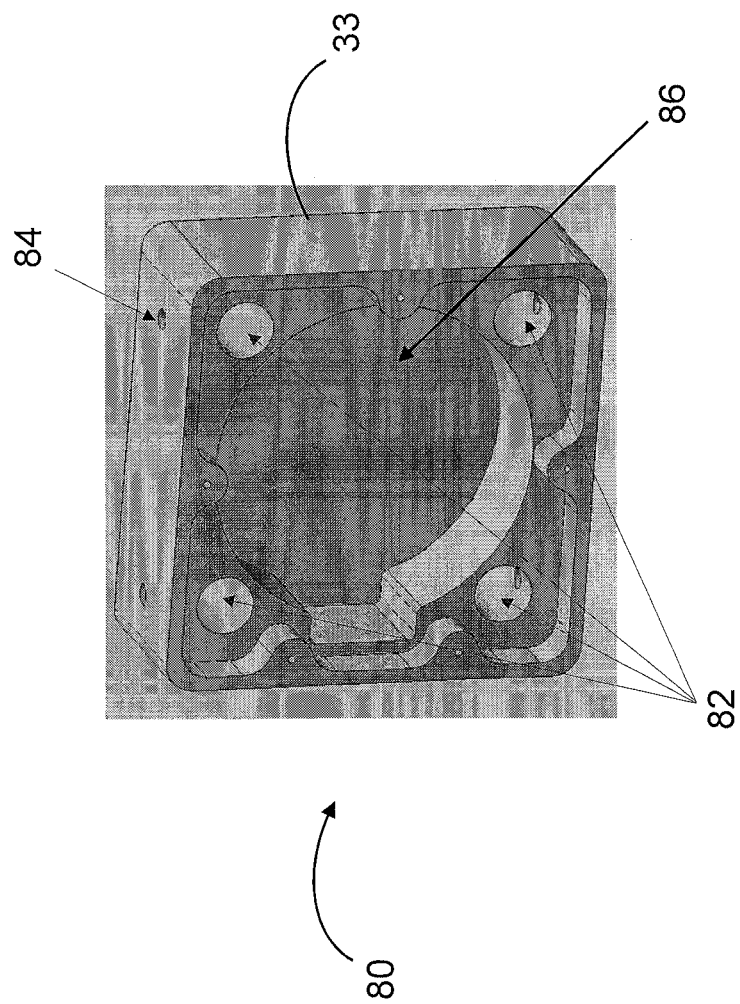
FIG. 3B schematically illustrates an example housing in accordance with certain embodiments described herein.

The at least one light source 30 comprises four laser diodes 31 mounted in a housing 33 and aligned such that the light beams 32 from the laser diodes 31 are substantially parallel to one another. For example, FIG. 3B schematically illustrates an example housing 33 in accordance with certain embodiments described herein. The back side 80 of the housing 33 is shown in FIG. 3B, which comprises a plurality of recesses 82, each recess 82 configured to receive a corresponding laser diode 31. The housing 33 further comprises a plurality of access holes 84 corresponding to the plurality of recesses 82. Each access hole 84 provides a conduit through which epoxy, glue, or other affixing material can be inserted into a corresponding recess 82 to affix a laser diode 31 in the recess 82. The housing 33 can further comprise one or more circuitry recesses 86 configured to contain one or more of the control circuitry 34, the drive circuitry 36, and at least one battery. The housing 33 can comprise plastic, and the housing can comprise a cavity configured to accept a control board (e.g., the control circuitry 34, the driver circuitry, and one or more batteries. In certain embodiments, the apparatus 10 can use very little power and can be powered by one or more permanent batteries, one or more non-rechargeable batteries, or one or more rechargeable batteries.

Figure 3C:
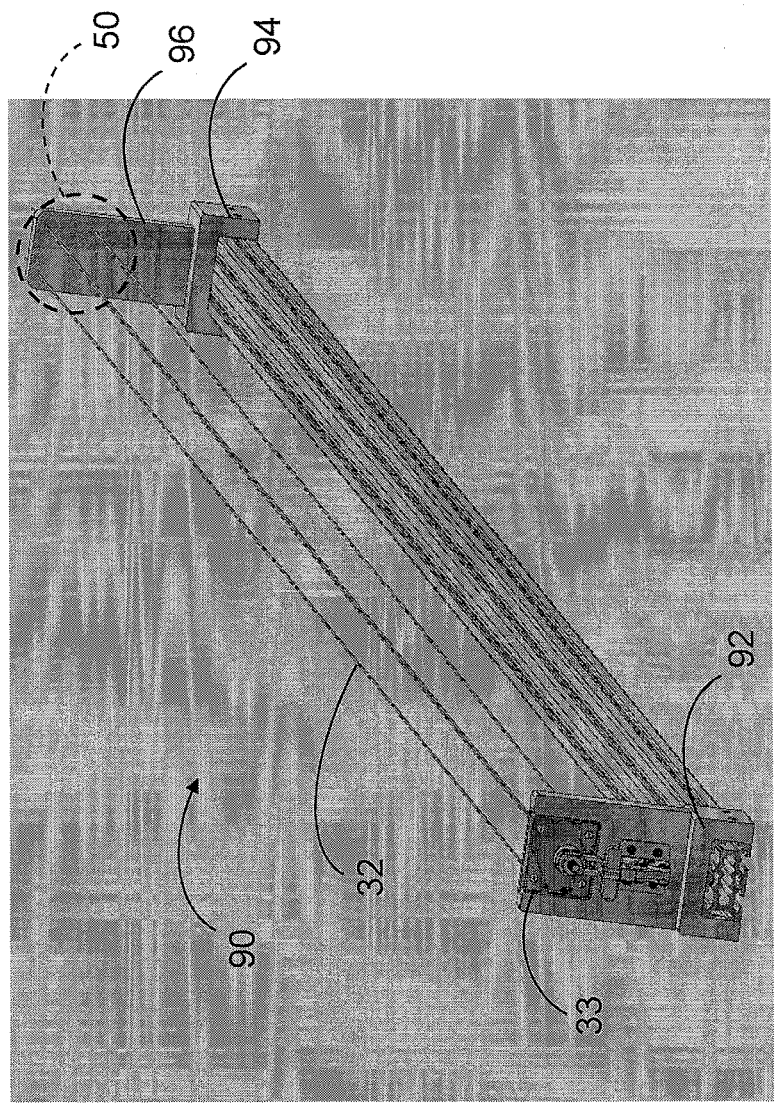
FIG. 3C schematically illustrates an example fixture for aligning the at least one light emitting devices within the housing in accordance with certain embodiments described herein.

FIG. 3C schematically illustrates an example fixture 90 for aligning the at least one light emitting devices (e.g., laser diodes 31) within the housing 33 in accordance with certain embodiments described herein. The fixture 90 comprises a first mount 92 configured to receive the housing 33 and a second mount 94 having a target 96 mounted thereon. Aligning the laser diodes 31 within the housing 33 can comprise placing the laser diodes 31 within the recesses 82 and turning on the laser diodes 31. The target 96 can be placed at a predetermined distance from the housing 33 and can be illuminated by the light beams 32 from the laser diodes 31, forming the reference pattern 50 on the target 96.

Affixing material (e.g., epoxy, glue) can be inserted into the recesses 82 through the access holes 84 (e.g., the affixing material enveloping the laser diode 31 within the recess 82). If needed, before the affixing material hardens to affix the laser diodes 31 within the recesses 82, the laser diodes 31 can be adjusted within the recesses 82 to align the light beams 32 to be substantially parallel to one another and to project the desired reference pattern 50 onto the target 96. If the light beams 32 are not sufficiently parallel to one another (e.g., less than 0.15 degree from being parallel from one another), then more distortion in the measurement will occur with increased distance between the physical object 40 and the digital camera 60. Once alignment is complete, the affixing material can be allowed to dry such that the laser diodes 31 are aligned with respect to one another to form a module which generates the plurality of substantially parallel light beams 32. In certain embodiments, such a fixture 90 and alignment method can provide a cost-effective way to create a reference pattern 50 which is permanently aligned and resolves issues with the difficulty of alignment.

In FIGS. 3A-3C, the reference pattern 50 generated by the plurality of substantially parallel light beams 32 projected onto the physical object comprises four features 52 (e.g., beam spots) in a substantially square pattern. Each pair of beam spots of the four beam spots defines a physical distance having a predetermined magnitude between the two beam spots of the pair. Certain such embodiments with at least four beam spots advantageously provide a way to determine pixel density information (e.g., at least one conversion factor) in at least two directions along a surface of the physical object (e.g., along a height of the physical object and along a width of the physical object).

Other reference patterns 50 are also compatible with certain embodiments described herein. For example, the features 52 of the reference pattern 50 can comprise a single pair of beam spots having a physical dimension with a predetermined magnitude (e.g., for two beam spots generated by two substantially parallel light beams 32 projected from two light emitting devices spaced by a fixed distance from one another, the physical dimension can be the distance between the two beam spots and the predetermined magnitude can be the fixed distance). For another example, the reference pattern 50 can comprise one or more grids comprising a plurality of beam spots or lines (e.g., two squares next to one another). Other reference patterns 50 of beam spots, lines, or grids compatible with certain embodiments described herein include, but are not limited to, triangular, hexagonal, or combinations thereof. Each of these reference patterns 50 can be configured to provide desired detailed information regarding the physical dimensions of the physical object depicted in the digital image 20. For example, the spacing between the features 52 of the reference pattern 50 can be designed for different applications. For physical objects that are between 5 centimeters to 15 meters in size (e.g., height, width, or both), a square reference pattern 50 with 20 millimeters between features 52 can be used. For larger physical objects, a larger spacing between the features can be more suitable and can lower the error in measurement.

In addition, in certain embodiments, deformities of the reference pattern 50 can be detected (e.g., automatically by an image processing circuit) and used (e.g., automatically by the image processing circuit) to obtain information regarding the relative orientation between the plane of the surface of the physical object upon which the reference pattern 50 is projected and the imaging plane of the digital camera 60. For example, the deformities of the reference pattern 50 can be detected and used to determine whether the surface on which the reference pattern 50 is projected is perpendicular to the light beams 32 (e.g., whether the plane of the surface of the physical object depicted in the digital image 20 is perpendicular to the light beams 32 or whether the plane of the surface of the physical object depicted in the digital image 20 is parallel to the imaging plane of the digital camera 60).

FIGS. 4A-4D schematically illustrate various deformities of the reference pattern 50 projected onto a surface of a physical object 40 in accordance with certain embodiments described herein. The reference pattern 50 comprises four features 52 (e.g., beam spots) in a substantially square pattern and the digital camera 60 and the light source 30 are mechanically coupled to one another such that the imaging plane of the digital camera 60 is perpendicular to the light beams 32. In configurations in which the reference pattern 50 is undistorted (e.g., square, as schematically shown in FIG. 4A) and the beam spots are undistorted, the imaging plane of the digital camera 60 is parallel to the plane of the surface upon which the reference pattern 50 is projected and the light beams 32 are perpendicular to the surface upon which the reference pattern 50 is projected. In other configurations in which the reference pattern 50 and the beam spots are distorted, the imaging plane of the digital camera 60 is not parallel to the plane of the surface upon which the reference pattern 50 is projected. For example, in FIG. 4B, the reference pattern 50 is elongated in a first direction into a rectangular pattern and the beam spots are similarly elongated, indicating that the imaging plane of the digital camera 60 deviates from being parallel to the plane of the surface upon which the reference pattern 50 is projected. In FIG. 4C, the reference pattern 50 is elongated in a second direction (perpendicular to the first direction) into a rectangular pattern and the beam spots are similarly elongated, indicating that the imaging plane of the digital camera 60 deviates from being parallel to the plane of the surface upon which the reference pattern 50 is projected. In FIG. 4D, the reference pattern 50 is rotated while remaining a square pattern with undistorted beam spots, indicating that the imaging plane of the digital camera 60 is parallel to the plane of the surface upon which the reference pattern 50 is projected but is rotated such that the horizontal and vertical directions for the imaging plane are not parallel to the horizontal and vertical directions of the light source 30.

Figure 5:
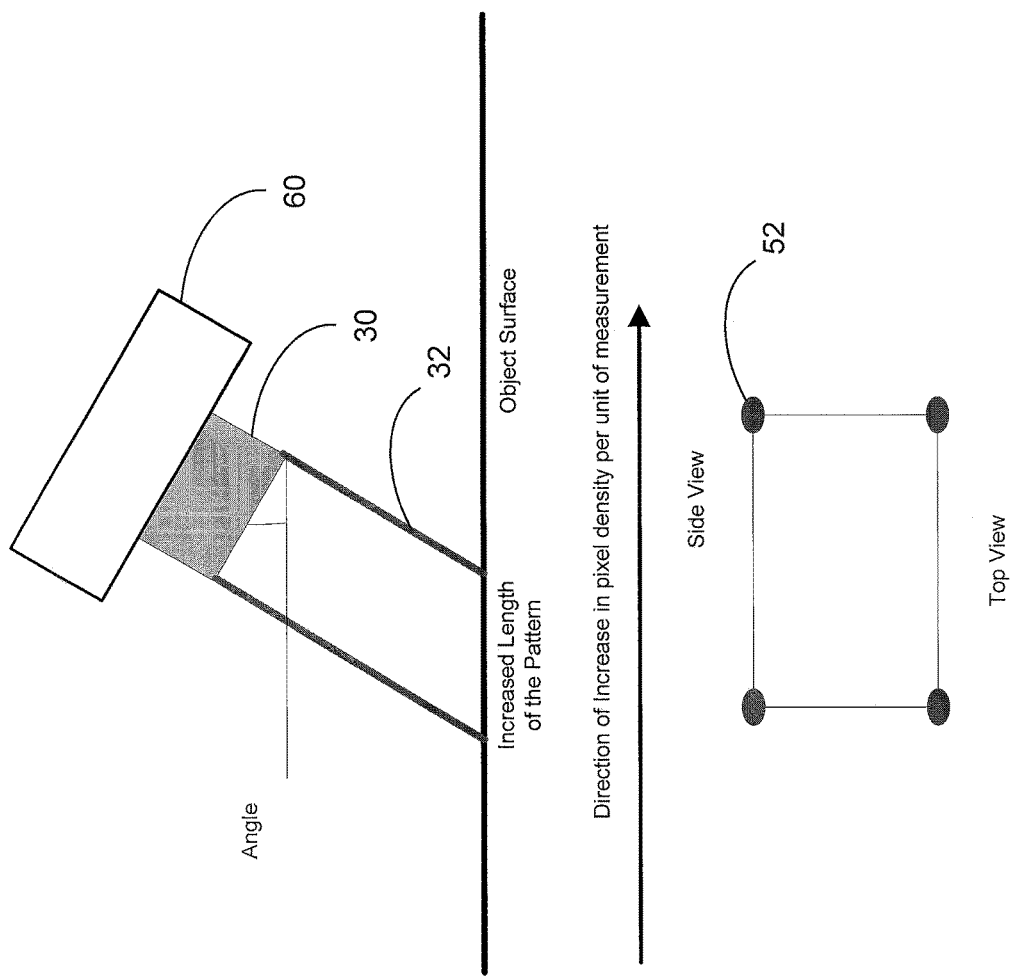
FIG. 5 schematically illustrates an example configuration having a non-zero angle between the imaging plane of the digital camera and the plane of the surface upon which the reference pattern is projected.

In configurations in which the imaging plane of the digital camera 60 is substantially perpendicular to the plurality of substantially parallel light beams 32, analysis of these distortions can be detected (e.g., automatically by an image processing circuit) and used (e.g., automatically by the image processing circuit) to derive the angle deviation from parallel between the imaging plane of the digital camera 60 and the plane of the surface upon which the reference pattern 50 is projected. FIG. 5 schematically illustrates an example configuration having a non-zero angle between the imaging plane of the digital camera 60 and the plane of the surface upon which the reference pattern 50 is projected. For example, for a reference pattern 50 having a ratio of length versus width of 20/21=0.9524, the angle deviation from parallel between the imaging plane of the digital camera 60 and the plane of the surface upon which the reference pattern 50 is projected is equal to $\cos^{-1}(0.9524)$, which is about 18 degrees. Such angle deviations can be used to infer variations in pixel density across a width or length of the digital image 20. For example, if a reference pattern 50 comprising four laser points is projected onto a surface of a physical object 40, one of the following situations can occur:

(i) A square pattern can be detected, within some tolerance. This tolerance can be experimentally determined. The square pattern indicates that the surface of the physical object 40 is parallel to the image plane of the digital camera 60, and indicates that the pixel densities will be almost the same for both width and height directions.

(ii) A rectangular pattern can be detected. The distance in pixels will be greater in one direction than in the other. This rectangular pattern indicates that the image plane of the digital camera 60 is not parallel to the surface of the physical object 40, and indicates that the pixel density in width direction will be different than pixel density in height.

In the immediate vicinity of the reference pattern 50, the pixel densities can be measured by comparing the distance in pixels between two vertical points versus two horizontal points. The measurements can be made more precise by looking up a table and determining distortion based on the distance from the center of the image to the edge of the image based on camera type. The same information can then be input in regions of interest in the metadata such that the digital image 20 will be self-contained and can be post-processed by a separate device or system (e.g., via hardware, software, or both) or immediately by the digital camera 60.

Figure 6:
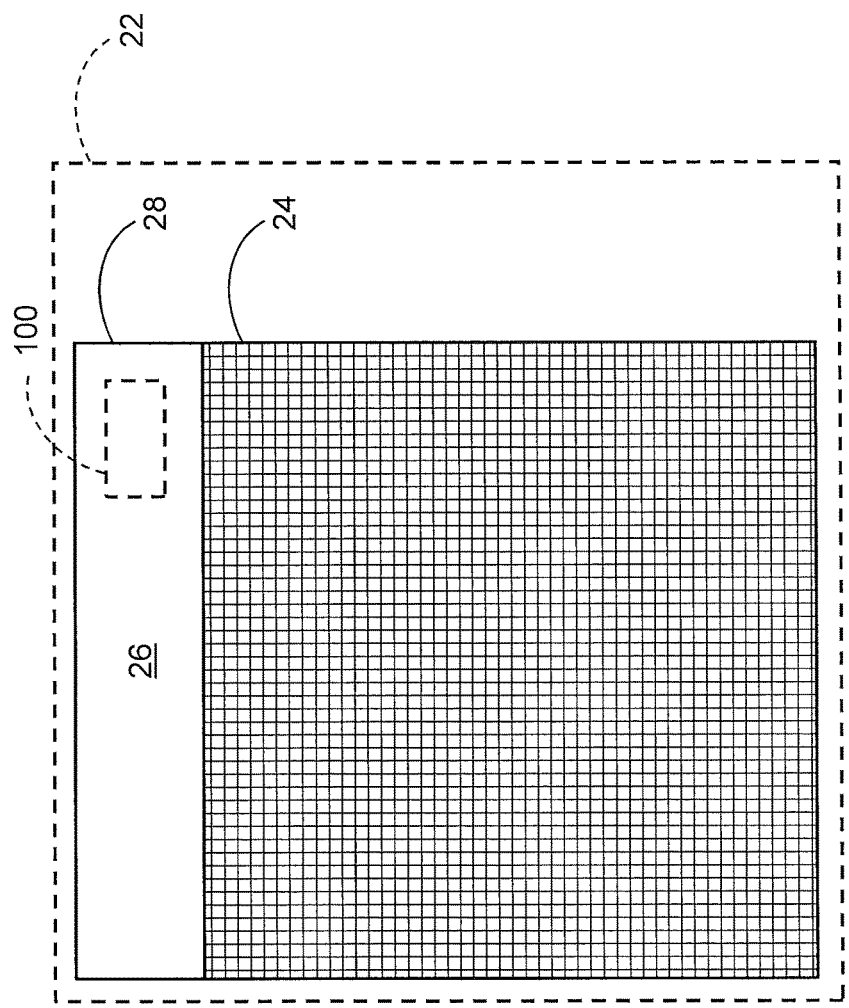
FIG. 6 schematically illustrates an example image data file having an example format that is compatible with certain embodiments described herein.

FIG. 6 schematically illustrates an example image data file 22 having an example format that is compatible with certain embodiments described herein. For example, the image data file 22 can comprise a plurality of pixels 24 and metadata 26. Each pixel of the plurality of pixels 24 can comprise image data for the corresponding pixel, denoting the color, intensity, or both of the pixel. For example, the image data for each pixel can comprise RGB values for a color image, comprising three values corresponding to intensity levels of three colors (e.g., red, blue, green) of the pixel, with each intensity level denoted by several bytes per pixel. The metadata 26 can describe the number of rows and columns of pixels in the plurality of pixels 24, the number of bits per pixel, as well as other data regarding the plurality of pixels 24. The metadata 26 can be used by the apparatus 10, or by a computer or other imaging device that subsequently receives the image data file 22, to determine how to interpret the plurality of pixels 24 in the image data file 22. In certain embodiments, as schematically illustrated by FIG. 6, the metadata 26 is included in a header section 28 of the image data file 22. In certain embodiments, the metadata 26 can further comprise image compression information regarding compression of the image data file 22 to be used by a computer or other imaging device that subsequently receives the image data file 22 to decode the compressed image data file 22.

In certain embodiments, the metadata 26 of the image data file 22 comprises pixel density information 100 (e.g., at least one conversion factor). The pixel density information 100 comprises information regarding the relationship between the plurality of pixels 24 of the digital image 20 and the physical dimensions of the at least one physical object depicted in the digital image 20. For example, the pixel density information 100 can include a first conversion factor corresponding to the relationship of pixels along a first direction to a corresponding physical dimension in the first direction (e.g., a pixel density for height of the physical object 40), and a second conversion factor corresponding to the relationship of pixels along a second direction to a corresponding physical dimension in the second direction (e.g., a pixel density for width of the physical object 40). In certain embodiments, the height pixel density and the width pixel density are different from one another, while in certain other embodiments, the height pixel density and the width pixel density are the same as one another. Certain embodiments described herein advantageously provide the pixel density information 100, which is not found in conventional digital image files, and the pixel density information 100 can be embedded in the metadata 26 of the image data file 22 to allow size information regarding the physical object denoted by the digital image 20 (e.g., previously derived from the digital image 20) to be shared with other devices which receive the digital image 20.

In certain embodiments, the digital image 20 can comprise one or more regions of interest (e.g., regions in which the physical dimensions of the physical object depicted within the region are of interest). There could be multiple regions of interest within a digital image 20, and these regions can be determined using various methods (e.g., using image processing software and/or hardware to detect edges, insets, or raised areas in the digital image 20). Pixel density information 100 determined using the reference pattern 50 is generally most valid for a region of interest in the vicinity of the reference pattern 50 (e.g., a region comprising the reference pattern 50, a region in proximity to the reference pattern 50). In certain embodiments, the metadata 26 includes information which identifies (e.g., demarcates) the different regions of interest and includes pixel density information 100 for each of these different regions of interest (e.g., each region of interest having its own range of X-coordinates and range of Y-coordinates, and having a height pixel density value and a width pixel density value). Several metrics can be added to the metadata 26 to allow a decoder configured to access the image data file 22 of the digital image 20 and to extract the pixel density information 100 from the metadata 26 (e.g., so that the decoder can access the physical distance information corresponding to the physical object 40 depicted by the digital image 20).

Various methods for embedding the pixel density information 100 within the metadata 26 of the digital image 20 and for extracting the pixel density information 100 from the metadata 26 of the digital image 20 can be used to allow for sharing of the pixel density information 100 among various devices and systems which receive or use the digital image 20. For example, by including the pixel density information 100 in the metadata 26, the pixel density information 100 can be shared via the cloud or mobile devices where the receiving device includes decoding software and/or hardware or is able to access a service which provides appropriate decoding tools (e.g., online).

Figure 7:
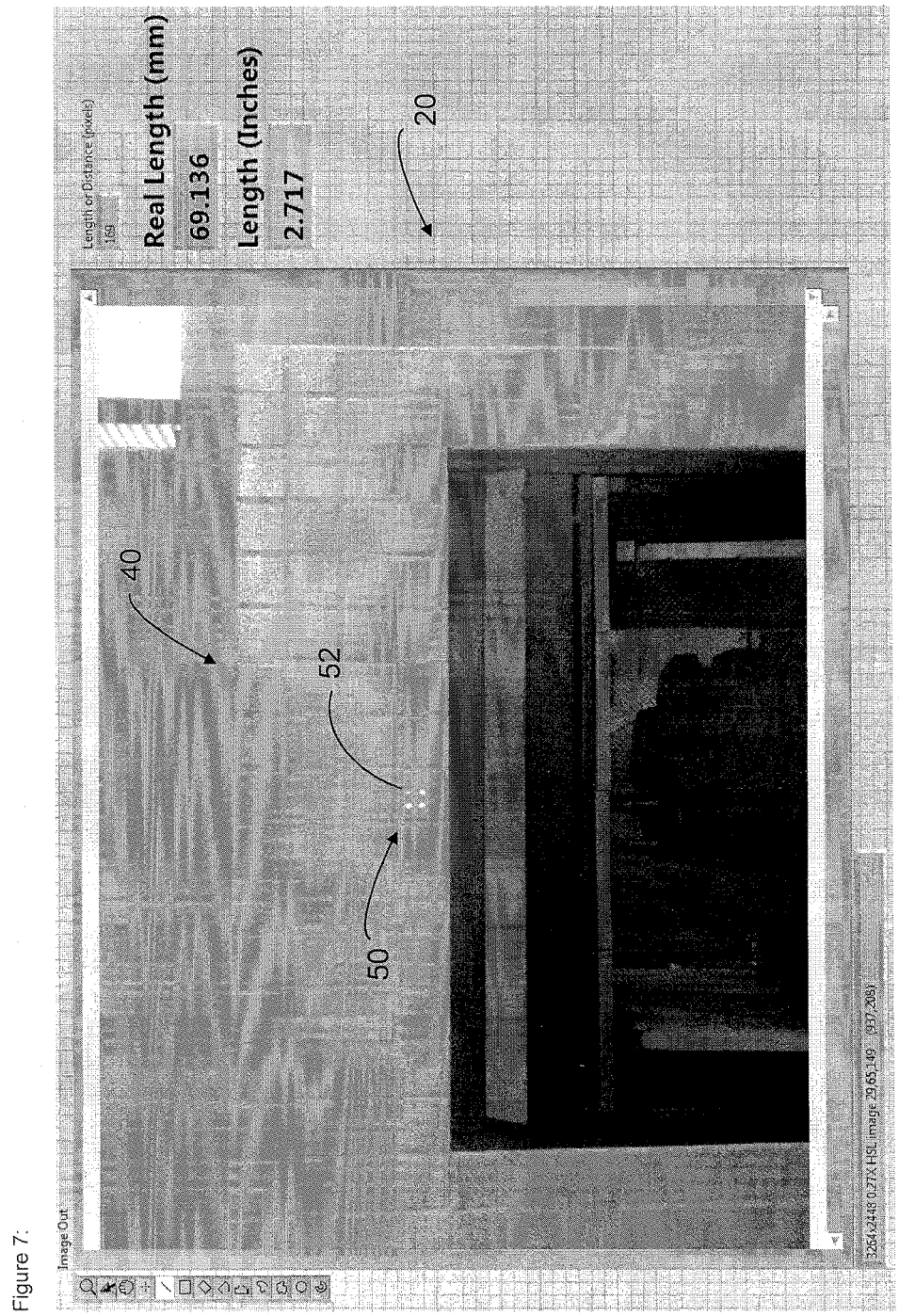
FIG. 7 illustrates an example digital image depicting a physical object and a reference pattern in accordance with certain embodiments described herein.

Once an enhanced digital image 20 (e.g., a digital image 20 having a header 28 with metadata 26 comprising the pixel density information 100) has been obtained and decoded by the device receiving the digital image 20 (e.g., the digital camera 60 or a device separate from the digital camera 60), the metadata 26 can be used by the receiving device to interpret the pixel distance between various segments of the digital image 20 to extract real-world size information about one or more segments of the physical object 40 depicted in the digital image 20. For example, FIG. 7 illustrates an example digital image 20 depicting a physical object 40 and a reference pattern 50 in accordance with certain embodiments described herein. The physical object 40 comprises a fireplace hearth and the reference pattern 50 comprises a grid of four features 52 (e.g., beam spots) forming a square pattern with sides of 18 mm in length. Within the digital image 20, the sides of the reference pattern 50 are 44 pixels in length. The header 28 of the digital image 20 can comprise the following metadata 26:

00004 1 'Number of segments of interest
00005 25 'X offset of the first segment
00006 125 'Y offset of the first segment
00007 400 'Width of segment 1
00008 400 'Height of segment 1
00009 18 '(mm) distance between features in reference grid
0000A 44 'Distance in pixels between reference features in X direction.
0000B 44 'Distance in pixels between reference features in Y direction.

In this example digital image 20, each pixel represents 0.40909 mm (18 mm/44 pixels). Therefore, if two points in the digital image 20 are found to be separated by 169 pixels, the real-world distance between those two points will be 69.136 mm (169 pixels*0.40909 mm/pixel) or 2.717 inches.

In certain embodiments, a system is configured to measure at least one physical dimension in a digital image 20. The system can comprise an input configured to receive at least a portion of the digital image 20 having a predetermined pixel distribution and depicting at least one physical object 40. The digital image 20 has a conversion factor that relates pixels to physical dimensions within the digital image 20. The system can further comprise a measuring circuit operable to select at least two pixels within the portion of the digital image 20. The two pixels can correspond to two locations on the at least one physical object depicted by the digital image 20 (e.g., two locations selected by the user of the system). The measuring circuit is further operable to determine a number of pixels along a line defined by the two pixels within the portion of the digital image 20. The measuring circuit is further operable to calculate a physical distance between the two locations on the at least one physical object by multiplying the conversion factor with the number of pixels. The measuring circuit is further operable to store the calculated physical distance with the digital image 20. Thus, the system (e.g., a graphical tool such as used in FIG. 7) can use the metadata 26 to measure the distance between any two points in the digital image 20 in pixels and convert this measurement to a real-world distance measurement (e.g., millimeters, inches). The closer the apparatus 10 (e.g., the digital camera 60 and the light source 30) is to the physical object 40, the more pixels there will be between the features 52 of the reference pattern 50.

In certain embodiments, some or all of the following features can be used:
  At least one light source 30 operable to emit a reference pattern 50 comprising a reference grid of known size on an object/surface
  A digital camera 60 operable to capture a digital image 20 of the object and the reflection of the reference grid
  An image processing unit operable to analyze the digital image 20 and to find the reference grid in the image
  A calculating unit operable to calculate a pixel density per real-world unit of measurement (e.g., such as milliliters or inches) from the analysis.
  A measuring unit operable to use the information from the calculating unit to measure the distance in real-world units between any two points on the digital image.

In certain embodiments, some or all of the following features can be used:
  A plurality of focused light sources (e.g., laser diodes) selectively actuated to emit a plurality of parallel light beams projecting a reference pattern comprising a plurality of beam spots onto a target surface in a predefined formation with a known distance between them, the distance between two reference beam spots on the target surface being the same as the distance between the two light sources emitting the two reference beam spots A digital camera operable to take a digital image of the surface/object, to analyze the digital image, to detect the reference pattern in the image, to detect objects in the vicinity of the reference pattern (e.g., by edge detection techniques), and to measure distances (in pixels) between beam spots in the digital image.

Since the distance between the beam spots is fixed at a nominal distance, the corresponding distance in pixels indicates a pixel density per unit of measurement at the surface where the measurement is being made.

From the information extracted from the digital image, the size of any object in the image which is on the same plane as the reference pattern can be calculated from the pixel distance on any part of an object or the complete object.

In certain embodiments, some or all of the following features can be used:

A device having a square formation of light sources (e.g., laser diodes) at a fixed distance (e.g., 20 mm) from each other Drive circuitry operable to drive the light sources Control circuitry operable to turn on the light sources on demand by remote control using wireless communication signals (e.g., via Bluetooth, Wifi, or serial communication)

The wireless communication signals generated by software running on a mobile terminal (e.g., a smartphone comprising the digital camera) to command the light source to turn on.

Two images can be captured consecutively: One with the light sources activated to project the reference pattern onto the object (e.g., a first image) and the other with the light sources deactivated and the reference pattern not projected onto the object (e.g., a second image).

The image is captured with the reference pattern on is analyzed and pixel density per unit of measurement is deducted from it.

The results of the analysis are kept in memory and applied to the second image which is captured with the reference pattern turned off. The second image can be captured after the first image is captured, or vice versa.

The pixel density and vicinity information is then written to metadata (e.g., in a header file) of an image that contains the object of interest to be measured, advantageously allowing for permanently embedding the size information for the object of interest in the digital image that can be viewed by any user at a later time.

Figure 8:
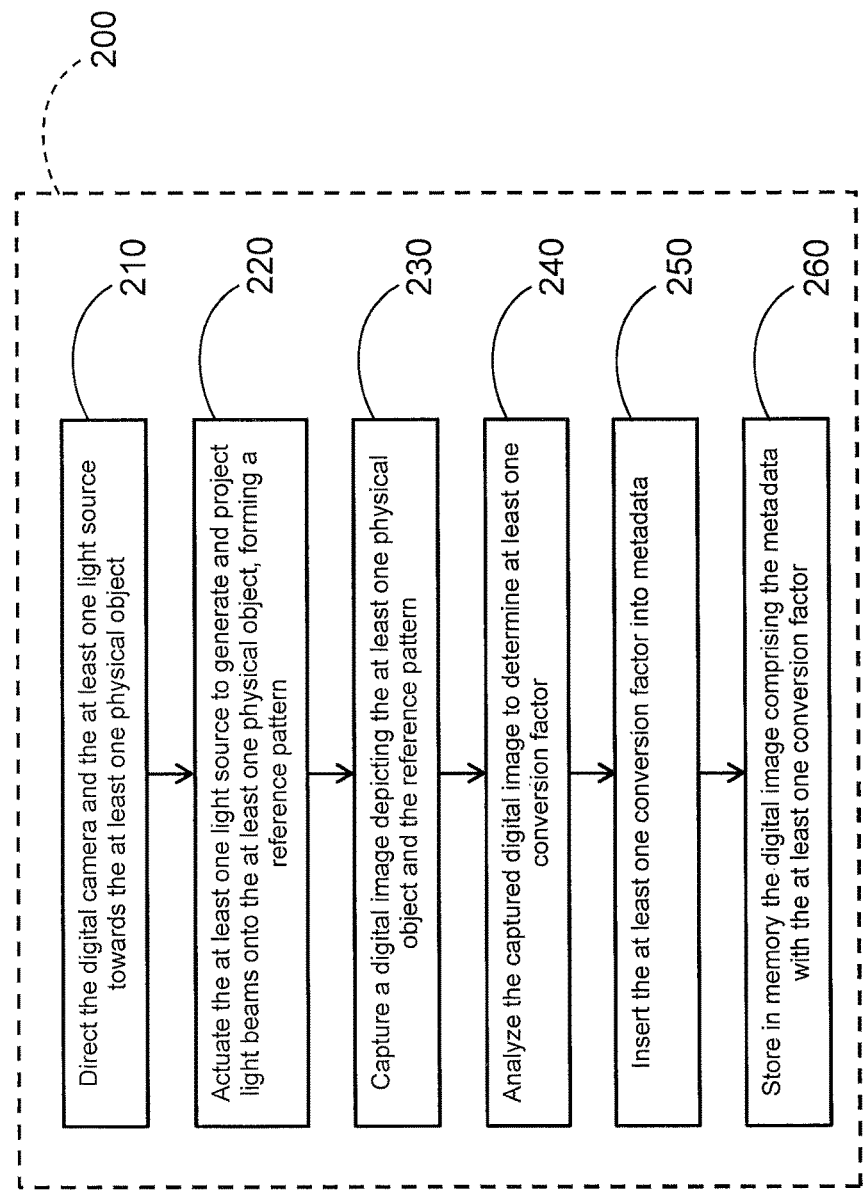
FIG. 8 is a flow diagram of an example method for generating a digital image configured to facilitate measuring at least one physical dimension in the digital image in accordance with certain embodiments described herein.

FIG. 8 is a flow diagram of an example method 200 for generating a digital image 20 configured to facilitate measuring at least one physical dimension in the digital image 20 in accordance with certain embodiments described herein. While the method 200 is described with regard to the apparatus 10 described herein, other devices and systems may also be used. The method 200 can be performed using an apparatus 10 comprising at least one light source 30 and a digital camera 60, such as a smartphone or tablet running an app (e.g. an application program installed on the smartphone or tablet by the user) to be used in performing the method 200.

In an operational block 210, the method 200 comprises directing the digital camera 60 and the at least one light source 30 of the apparatus 10 towards at least one physical object 40. In an operational block 220, the method 200 further comprises actuating the at least one light source 30 to generate and project a plurality of substantially parallel light beams 32 onto the at least one physical object 40, forming a reference pattern 50. The reference pattern 50 comprises at least one feature defining a physical dimension having a predetermined magnitude.

In an operational block 230, the method 200 further comprises capturing a digital image 20 depicting the at least one physical object 40 and the reference pattern 50. For example, both the operational block 220 and the operational block 230 can be initiated by a user pressing a button on the apparatus 10 which then signals the apparatus 10 (e.g., the software app running on the apparatus 10) to actuate the at least one light source 30 and to capture the digital image 20. In certain embodiments, capturing the digital image 20 can comprise capturing the digital image 20 depicting both the physical object 40 and the reference pattern 50 and capturing another digital image depicting only the physical object 40 (e.g., a digital image captured while the at least one light source 30 is deactivated).

In an operational block 240, the method 200 further comprises analyzing the captured digital image 20 to determine at least one conversion factor of the digital image 20. For example, an image analysis circuit of the apparatus 10 (e.g., hardware under control of the software app running on the apparatus 10) can identify the at least one feature 52 in the digital image 20, determine a number of pixels corresponding to the at least one feature 52 in the digital image 20, and calculate a conversion factor (e.g., a pixel density) equal to the predetermined magnitude divided by the number of pixels. In certain embodiments, the image analysis circuit of the apparatus 10 can determine a first number of pixels between features 52 (e.g., beam spots) in a first direction and a second number of pixels between features 52 in a second direction, and can calculate a first conversion factor (e.g., a first pixel density) for the first direction and a second conversion factor (e.g., a second pixel density) for the second direction (e.g., by dividing a first predetermined magnitude by the first number of pixels and dividing a second predetermined magnitude by the second number of pixels).

Various different algorithms can be used to find the reference pattern 50 (e.g., grid) in the digital image 20 in accordance with certain embodiments described herein. These algorithms can be actuated either in hardware, in software, or both. In a first example algorithm compatible with certain embodiments described herein, a first digital image of the physical object 40 taken with the light source 30 deactivated can be subtracted from a second digital image 20 of the physical object 40 taken with the light source 30 activated and the reference pattern 50 projected onto the physical object 40. The resulting difference image contains substantially only the reference pattern 50. A mask can be generated in memory and the difference image can be indexed to find the center of each feature 52 of the reference pattern 50 or clusters of features 52 of different portions of the reference pattern 50. The centers found can then be used to calculate the distances in a first direction (e.g., X direction) and in a second direction (e.g., Y direction) between two adjacent centers. The calculated distance in the first direction can be used to generate a first pixel density in the first direction and the calculated distance in the second direction can be used to generate a second pixel density in the second direction.

In a second example algorithm compatible with certain embodiments described herein, instead of taking a pair of digital images, one with the reference pattern 50 and one without, and generating a difference image, a single digital image 20 can be taken with the light source 30 activated and the reference pattern 50 projected onto the physical object 40. A region of the digital image 20 can be identified where the reference pattern 50 is expected to be found, and a mask can be generated to find features within this region having intensities higher than a predetermined threshold, with these high intensity features being the features 52 projected onto the physical object 40. This second example algorithm can then proceed as described above with regard to the first example algorithm.

In a third example algorithm compatible with certain embodiments described herein, instead of solely relying on the intensity of features for identifying the features 52, a color (e.g., within a predetermined range of pixel values) of the pixels or clusters of pixels can be used to identify the features 52 projected onto the physical object 40. The color can be used in place of the use of intensity as described with regard to the second example algorithm or in conjunction with the use of intensity. Other algorithms for finding the reference pattern 50 are also compatible with certain embodiments described herein.

In an operational block 250, the method 200 further comprises inserting the at least one conversion factor into metadata of a digital image. In certain embodiments, the at least one conversion factor is inserted into metadata of the digital image 20 depicting the at least one physical object 40 and the reference pattern 50. In certain other embodiments, the at least one conversion factor is inserted into metadata of another digital image depicting the at least one physical object 40 but not depicting the reference pattern 50 (e.g., a digital image taken with the at least one light source 30 deactivated). In an operational block 260, the method 200 further comprises storing in memory the digital image comprising the metadata with the at least one conversion factor (e.g., in a local memory medium of the apparatus 10 or in a memory medium of a separate server, accessed via the internet or the cloud).

Figure 9:
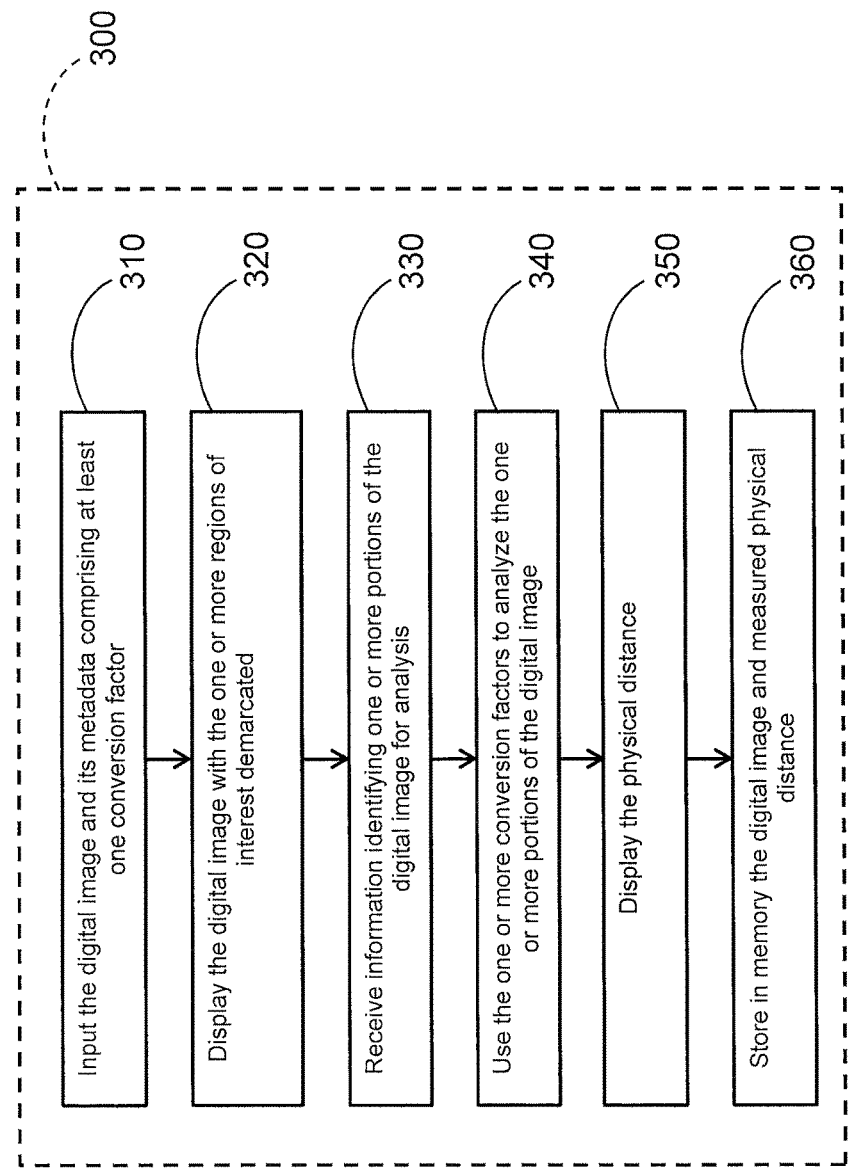
FIG. 9 is a flow diagram of an example method 300 for accessing a digital image 20 and measuring at least one physical dimension in the digital image 20 in accordance with certain embodiments described herein.

FIG. 9 is a flow diagram of an example method 300 for accessing a digital image 20 and measuring at least one physical dimension in the digital image 20 in accordance with certain embodiments described herein. While the method 300 is described with regard to accessing a digital image 20 generated using the apparatus 10 described herein, digital images 20 generated using other devices and systems may also be used. The method 300 can be performed using an apparatus 10 comprising at least one light source 30 and a digital camera 60, such as a smartphone or tablet running an app (e.g. an application program installed on the smartphone or tablet by the user) to be used in performing the method 300. The method 300 can also be performed using a device separate from the apparatus 10 (e.g., a separate desktop or laptop computer, smartphone, or tablet that receives the digital image 20 and its metadata 26.

In an operational block 310, the method 300 comprises inputting the digital image 20 and its metadata 26. The metadata 26 comprising at least one conversion factor (e.g., pixel density information 100) that relates pixels to at least one physical dimension within the digital image 20. The metadata 26 can also include information regarding one or more regions of interest within the digital image 20 and one or more conversion factors (e.g., a first pixel density in a first direction and a second pixel density in a second direction) for each of the one or more regions of interest. In an operational block 320, the method 300 further comprises displaying the digital image 20 to the user with the one or more regions of interest demarcated. In certain embodiments, measurement tools provided by the app can also be displayed to the user. The displayed digital image 20 may comprise annotations from previous operations (e.g., previous measurements obtained from the digital image 20).

In an operational block 330, the method 300 further comprises receiving information from the user identifying one or more portions of the digital image 20 for analysis. In an operational block 340, the method 300 further comprises using the one or more conversion factors to analyze the one or more portions of the digital image 20. For example, a measuring circuit (e.g., hardware under control of the software app running on the device performing the method 300) can receive input identifying at least two pixels within the portion of the digital image 20 chosen by the user and corresponding to two locations on the physical object 40 depicted by the digital image 20. The measuring circuit can determine the number of pixels along a line defined by the two pixels and can calculate a physical distance between the two locations by multiplying the conversion factor (e.g., pixel density) with the number of pixels. In certain embodiments, the measuring circuit can determine a first number of pixels between the two locations in a first direction and a second number of pixels between the two locations in a second direction, can calculate a first physical distance between the two locations in the first direction by multiplying a first conversion factor (e.g., a first pixel density) by the first number of pixels and a second physical distance between the two locations in a second direction by multiplying a second conversion factor (e.g., a second pixel density) by the second number of pixels, and can determine a total physical distance between the two locations by calculating a square root of the sum of the first physical direction squared and the second physical direction squared.

In an operational block 350, the method 300 further comprises displaying the physical distance to the user. In an operational block 360, the method 300 further comprises storing in memory the physical distance (e.g., in a local memory medium of the device performing the method 300 or in a memory medium of a separate server, accessed via the internet or the cloud). In this way, the user can make new measurements and new annotations and can save the results with the digital image 20 for reuse.

In certain embodiments, the systems, methods, and apparatuses described herein can be used in a variety of contexts (e.g., in improving augmented reality applications). For example, merchants can use certain embodiments described herein to embed size information about their products in digital images depicting their products on the merchants' webpages. Consumers can then easily obtain size information about these products by simply using a browser to access the digital images.

For another example, consumers can use certain embodiments described herein to: (i) take digital images of objects (for example, a piece of furniture), capturing size information regarding the objects, and insert the size information in the metadata of the digital images to form augmented images; and (ii) use an apparatus (e.g., a smart camera device) to integrate an augmented image of an object with another augmented image of a scene (e.g., from their environment or surroundings). In certain such embodiments, the system comprises an image processing circuit operable to generate a composite digital image comprising the digital image (e.g., depicting the physical object) combined with at least a second digital image (e.g., depicting a second physical object or the scene). The digital image, the second digital image, or both the digital image and the second digital image can be scaled within the composite digital image such that the physical object and the second physical object or the scene are depicted to accurately show a relationship between the physical dimensions of the digital image and the physical dimensions of the second digital image. Such an "augmented reality" feature can be advantageously achieved because in both cases, the augmented image of an object and the augmented image of the scene both contain size information and hence one or both of the augmented images can be proportioned correctly such that the physical dimensions of both are consistent with one another.

For another example, multiple digital images of the same object can be taken from different views (e.g., front, top, and side views) and reconstructed into a three-dimensional image (e.g., by combining the digital images via hardware and/or software). Again, because size information is captured in the digital image, the various views can be proportioned properly relative to one another to create a three-dimensional image of the object.

In certain embodiments, a live analysis of a reference pattern can be advantageously used. For example, live data can be fed to the digital camera by capturing the reference pattern and can be used to measure distance from the object of interest. This can be done by using calibration data for a specific digital camera that uses certain embodiments described herein. Since pixel density increases inversely with respect to distance to the object, distance can be calculated by using a pixel distance between two adjacent features at least one known distance and extrapolating the actual distance from the digital camera to the object from that data. For example, if the distance between two adjacent features is measured in a digital image to be 40 pixels and that corresponds to 1200 mm in distance from the digital camera to the object, a new measurement of 100 pixels between two adjacent features in another digital image could be extrapolated to determine that a distance of 480 mm exists from the object to the digital camera (e.g., in certain embodiments in which the digital camera is linear, which can be tested for each digital camera and results can be tabulated and used in actual measurements).

In certain embodiments described herein, the digital images 20 can be processed immediately (e.g., by the digital camera 60) or can be post-processed (e.g., by a device separate from the digital camera 60). The digital images 20 taken in certain embodiments described herein are not merely pictures, but are "smart pictures" (e.g., digital images that include metadata) with information regarding size and distances embedded into the digital image 20.

Certain embodiments described herein are configured to create three-dimensional models of physical objects. For example, multiple digital images of a physical object can be combined (e.g., via hardware, software, or both) to create one single model of the physical object by combining these digital images 20. The model can also have size information built into it. This can be a useful feature for hobbyists or professionals. For example, a user can be asked (e.g., by software of the apparatus 10 or by software of a separate device) to take various images of the physical object 40 from different views, for example, top, side, and front. These multiple images can then be combined to create a three-dimensional model in a format (e.g., step file) that can be imported into a three-dimensional drawing package.

In certain embodiments, only one digital image 20 can be used by the user to measure the physical dimension of the physical object 40. A user can make the measurement in real-time (e.g., using the digital camera 60 that takes the digital image 20) or in post-processing of the digital image 20 (e.g., using a device separate from the digital camera 60 but that receives the digital image 20 taken by the digital camera 60). In certain embodiments, a user can measure anything in the digital image 20 that was not previously measured. In certain embodiments, metadata for the digital image 20 is embedded in the digital image 20. The user does not just embed the tags of measurement in the digital image 20. By having pixel density, a user can measure any aspect of the digital image 20 within regions of interest at a later point with the same or different platform.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, computing devices may be configured to implement the processes, algorithms and methodology of the present disclosure with the processing and/or execution of the various data and/or components described above.

Although described above in connection with particular embodiments, it should be understood the descriptions of the embodiments are illustrative of the invention and are not intended to be limiting. Various modifications and applications may occur to those skilled in the art without departing from the true spirit and scope of the invention. It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An apparatus configured to generate a digital image configured to facilitate measuring at least one physical dimension in the digital image, the apparatus comprising:
at least one light source configured to project a plurality of substantially parallel light beams onto at least one physical object spaced away from the at least one light source, the light beams forming a reference pattern on the at least one physical object, the reference pattern comprising at least one feature defining a physical dimension having a predetermined magnitude; and a digital camera configured to store a digital image of at least a portion of the at least one physical object and the at least one feature, the digital image comprising an image data file comprising a plurality of pixels and metadata, at least a portion of the metadata indicative of a conversion factor relating the predetermined magnitude of the physical dimension with a pixel distance corresponding to the predetermined magnitude of the physical dimension, wherein the digital camera is configured to consecutively acquire two digital images and to store the two consecutive digital images, the two consecutive digital images comprising the digital image of the at least the portion of the at least one physical object and the at least one feature and a second digital image of the at least the portion of the at least one physical object without the at least one feature, and wherein the digital camera is configured to derive the conversion factor only from the digital image and to include the conversion factor in the metadata of the second digital image.

2. The apparatus of claim 1, wherein the at least one light source comprises one or more laser diodes.

3. The apparatus of claim 1, wherein the at least one light source comprises control circuitry, drive circuitry, and a power source.

4. The apparatus of claim 3, wherein the control circuitry is operable to receive commands from the digital camera via a communication channel and to provide control signals to the drive circuitry to selectively activate and deactivate the at least one light sources.

5. The apparatus of claim 1, wherein the digital camera is configured to embed the conversion factor into the metadata of the second digital image such that the conversion factor can be retrieved, stored, and used by imaging devices that receive the second digital image.

6. The apparatus of claim 1, wherein the conversion factor comprises a ratio of the predetermined magnitude divided by the pixel distance.

7. The apparatus of claim 6, wherein the pixel distance is a number of pixels between two portions of the reference pattern within the digital image.

8. The apparatus of claim 6, wherein the reference pattern extends between two physical points depicted within the digital image, and the pixel distance is a distance in pixels of the digital image between the two physical points as depicted within the digital image.

9. The apparatus of claim 1, wherein the digital camera is mechanically coupled to the at least one light source, and is spaced from the reference pattern in a direction substantially parallel to the plurality of substantially parallel light beams.

10. The apparatus of claim 1, wherein the digital camera is configured to embed the conversion factor into the metadata of the digital image such that the conversion factor can be retrieved, stored, and used by imaging devices that receive the digital image.

11. The apparatus of claim 1, wherein the digital camera further comprises an image processing circuit operable to: (i) identify the at least one feature in the portion of the digital image; (ii) determine a number of pixels corresponding to the at least one feature in the portion of the digital image; and (iii) calculate the conversion factor equal to the predetermined magnitude divided by the number of pixels.

12. An apparatus configured to generate a digital image configured to facilitate measuring at least one physical dimension in the digital image, the apparatus comprising:

at least one light source configured to project a plurality of substantially parallel light beams onto at least one physical object spaced away from the at least one light source, the light beams forming a reference pattern on the at least one physical object, the reference pattern comprising at least one feature defining a physical dimension having a predetermined magnitude; and a digital camera configured to store a digital image of at least a portion of the at least one physical object and the at least one feature, the digital image comprising an image data file comprising a plurality of pixels and metadata, at least a portion of the metadata indicative of a conversion factor relating the predetermined magnitude of the physical dimension with a pixel distance corresponding to the predetermined magnitude of the physical dimension, wherein the digital camera is configured to consecutively acquire two digital images and to store the two consecutive digital images, the two consecutive digital images comprising the digital image of the at least the portion of the at least one physical object and the at least one feature and a second digital image of the at least the portion of the at least one physical object without the at least one feature, and wherein the digital camera is configured to derive the conversion factor from the digital image without using the second digital image and to include the conversion factor in the metadata of the second digital image.

13. The apparatus of claim 12, wherein the at least one light source comprises one or more laser diodes.

14. The apparatus of claim 12, wherein the at least one light source comprises control circuitry, drive circuitry, and a power source.

15. The apparatus of claim 14, wherein the control circuitry is operable to receive commands from the digital camera via a communication channel and to provide control signals to the drive circuitry to selectively activate and deactivate the at least one light sources.

16. The apparatus of claim 12, wherein the digital camera is configured to embed the conversion factor into the metadata of the second digital image such that the conversion factor can be retrieved, stored, and used by imaging devices that receive the second digital image.

17. The apparatus of claim 12, wherein the conversion factor comprises a ratio of the predetermined magnitude divided by the pixel distance.

18. The apparatus of claim 17, wherein the pixel distance is a number of pixels between two portions of the reference pattern within the digital image.

19. The apparatus of claim 17, wherein the reference pattern extends between two physical points depicted within the digital image, and the pixel distance is a distance in pixels of the digital image between the two physical points as depicted within the digital image.

20. The apparatus of claim 12, wherein the digital camera is mechanically coupled to the at least one light source, and is spaced from the reference pattern in a direction substantially parallel to the plurality of substantially parallel light beams.

21. The apparatus of claim 12, wherein the digital camera is configured to embed the conversion factor into the metadata of the digital image such that the conversion factor can be retrieved, stored, and used by imaging devices that receive the digital image.

22. The apparatus of claim 12, wherein the digital camera further comprises an image processing circuit operable to: (i) identify the at least one feature in the portion of the digital image; (ii) determine a number of pixels corresponding to the at least one feature in the portion of the digital image; and (iii) calculate the conversion factor equal to the predetermined magnitude divided by the number of pixels.

\* \* \* \* \*